US012676936B2

(12) United States Patent
Seto

(10) Patent No.: US 12,676,936 B2
(45) Date of Patent: Jul. 7, 2026

(54) IMAGE READING APPARATUS AND IMAGE FORMING APPARATUS

(71) Applicant: KYOCERA Document Solutions Inc., Osaka (JP)

(72) Inventor: Akifumi Seto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 279 days.

(21) Appl. No.: 18/704,675

(22) PCT Filed: Jun. 13, 2023

(86) PCT No.: PCT/JP2023/021826
§ 371 (c)(1),
(2) Date: Apr. 25, 2024

(87) PCT Pub. No.: WO2023/248857
PCT Pub. Date: Dec. 28, 2023

(65) Prior Publication Data
US 2025/0008038 A1    Jan. 2, 2025

(30) Foreign Application Priority Data
Jun. 21, 2022    (JP) ................................. 2022-099857

(51) Int. Cl.
*H04N 1/00* (2006.01)
*H04N 1/04* (2006.01)
*H04N 1/12* (2006.01)
(52) U.S. Cl.
CPC ........... *H04N 1/0084* (2013.01); *H04N 1/121* (2013.01)

(58) Field of Classification Search
None
See application file for complete search history.

(56) References Cited

U.S. PATENT DOCUMENTS 6,678,076 B1    1/2004  Hasegawa et al.
2009/0201549 A1*  8/2009  Asai ................... H04N 1/00689
                                                    358/1.15

FOREIGN PATENT DOCUMENTS

| JP | H0548806 | * | 2/1993 | ............... H04N 1/00 |
| JP | 2000128413 A | | 5/2000 | |
| JP | 2004072218 | * | 3/2004 | ............... H04N 1/00 |
| JP | 2010100429 | * | 5/2010 | ............... H04N 1/04 |
| JP | 2018198359 | * | 12/2018 | ............... H04N 1/00 |
| JP | 2018198379 | * | 12/2018 | ............... H04N 1/00 |

* cited by examiner

*Primary Examiner* — Beniyam Menberu
(74) *Attorney, Agent, or Firm* — IP Business Solutions, LLC.

(57) ABSTRACT

An image reading apparatus includes a CCD sensor that reads an image on a first face of a document, oriented upward on a document tray, while the document is being transported through the first transport route, a CIS that reads an image on a second face of the document, oriented downward on the document tray, while the document is being transported through the common transport route, and a controller that permits a facsimile communication device to transmit the image on the first face of the document read by the CCD sensor, and restricts the facsimile communication device from transmitting the image on the second face of the document, read by the CIS.

6 Claims, 9 Drawing Sheets

10

14

IMAGE READING APPARATUS AND IMAGE FORMING APPARATUS

TECHNICAL FIELD

The present invention relates to an image reading apparatus that reads and transmits an image of a document while transporting the document through one of a plurality of transport routes, and an image forming apparatus incorporated with such image reading apparatus. In particular, the present invention relates to a technique to prevent an image of a blank face of the document from being transmitted.

BACKGROUND ART

The image reading apparatus is configured to draw out a document from a document tray and transport the same through one of the plurality of transport routes, read the image on the front face of the document being transported through the one transport route, read the image on the back face of the document being transported through another transport route, and discharge the document from either transport route to the corresponding discharge tray.

In addition, some of existing image reading apparatuses include an openable cover that constitutes a part of the document transport route. In such an image reading apparatus, a straight transport route is formed, when the cover is opened. The document is delivered to the straight transport route, and a first contact image sensor reads the image on the front face of the document, being transported through the straight transport route. When the cover is closed, on the other hand, a curved transport route, branched from the straight transport route at a position downstream of the first contact image sensor in the transport direction of the document, is formed. The document is first delivered to the straight transport route, and the first contact image sensor reads the image on the front face of the document being transported through the straight transport route. Then the document is delivered to the curved transport route, and a second contact image sensor reads the image on the back face of the document being transported through the curved transport route.

CITATION LIST

Patent Literature

PTL 1: Japanese Unexamined Patent Application Publication No. 2000-128413

SUMMARY OF INVENTION

Technical Problem

Now, whereas the foregoing image reading apparatus is configured such that the first contact image sensor reads the image on the front face, which is oriented upward, of the document being transported through the straight transport route, the utility of the apparatus would become more versatile, if the image on the back face, which is oriented downward, of the document can also be read on the straight transport route.

However, providing an additional contact image sensor on the straight transport route, to read the image on the downwardly oriented back face of the document, leads to an increase in the number of parts and complication of the structure of the apparatus, thus resulting in an increase in manufacturing cost.

Further, some other existing image reading apparatuses are configured to read the image on the back face of the document, which is oriented downward on the document tray, while the document is being transported through the straight transport route, and read the image on the front face of the document, which is oriented upward on the document tray, while the document is being transported through the curved transport route. The user places the document on the document tray, with the front face of the document oriented upward, and the image reading apparatus reads the image on the front face, or images on both faces, of the document.

In the case of such other image reading apparatuses, in order to enable the image on the upwardly oriented front face of the document being transported through the straight transport route to be read, an additional image sensor, such as a contact image sensor, has to be provided, which is also disadvantageous.

In addition, causing the user to place the document on the document table, either in the upward orientation or downward orientation selectively, would make it possible to read the back face or front face of the document being transported through the straight transport route, without the need to increase the number of the contact image sensors. However, in the case where the user places the document, by mistake, with the front face (face to be read) of the document oriented upward, when the front face of the document is to be read, the image sensor reads the image on the back face (face not to be read), in this case oriented downward, of the document being transported through the straight transport route.

In particular, when the downwardly oriented back face of the document is blank, and the image on the downwardly oriented back face of the document is read by the contact image sensor, and transmitted via facsimile or network communication, the user may remain unaware that the blank document image has been transmitted to the communication counterpart.

The present invention has been accomplished in view of the foregoing situation, and provides a technique to prevent the image of the blank face of the document from being transmitted, when the image of the document is to be transmitted.

Solution to Problem

In an aspect, the present invention provides an image reading apparatus including a document tray, a common transport route, a first transport route and a second transport route branched from the common transport route, a switching device provided at a branch point between the first transport route and the second transport route, and configured to guide a document from the common transport route, to one of the first transport route and the second transport route, a document transport device that draws out the document placed on the document tray therefrom, transports the document through the common transport route, and delivers the document transported from the common transport route, to one of the first transport route and the second transport route, via the switching device, a first image sensor that reads an image on a first face of the document, oriented upward on the document tray, while the document is being transported through the first transport route, a second image sensor that reads an image on a second face of the document, oriented downward on the document tray, while the document is being transported through the common transport route, an image communication device that transmits the image on the first face or the image on the second face, via a network or facsimile communication, and a controller that permits the image communication device to transmit the image on the first face, read by the first image sensor, of the document being transported through the first transport route, and restricts the image communication device from transmitting the image on the second face, read by the second image sensor, of the document being transported through the common transport route and the second transport route.

In another aspect, the present invention provides an image forming apparatus including the foregoing image reading apparatus, and an image forming device that forms the image of the document, read by the image reading apparatus, on a recording sheet.

Advantageous Effects of Invention

The foregoing arrangement prevents, when the image of the document is to be transmitted, the image of the blank face of the document from being transmitted.

DESCRIPTION OF EMBODIMENTS

Hereafter, some embodiments of the present invention will be described, with reference to the drawings.

First Embodiment

Figure 1:
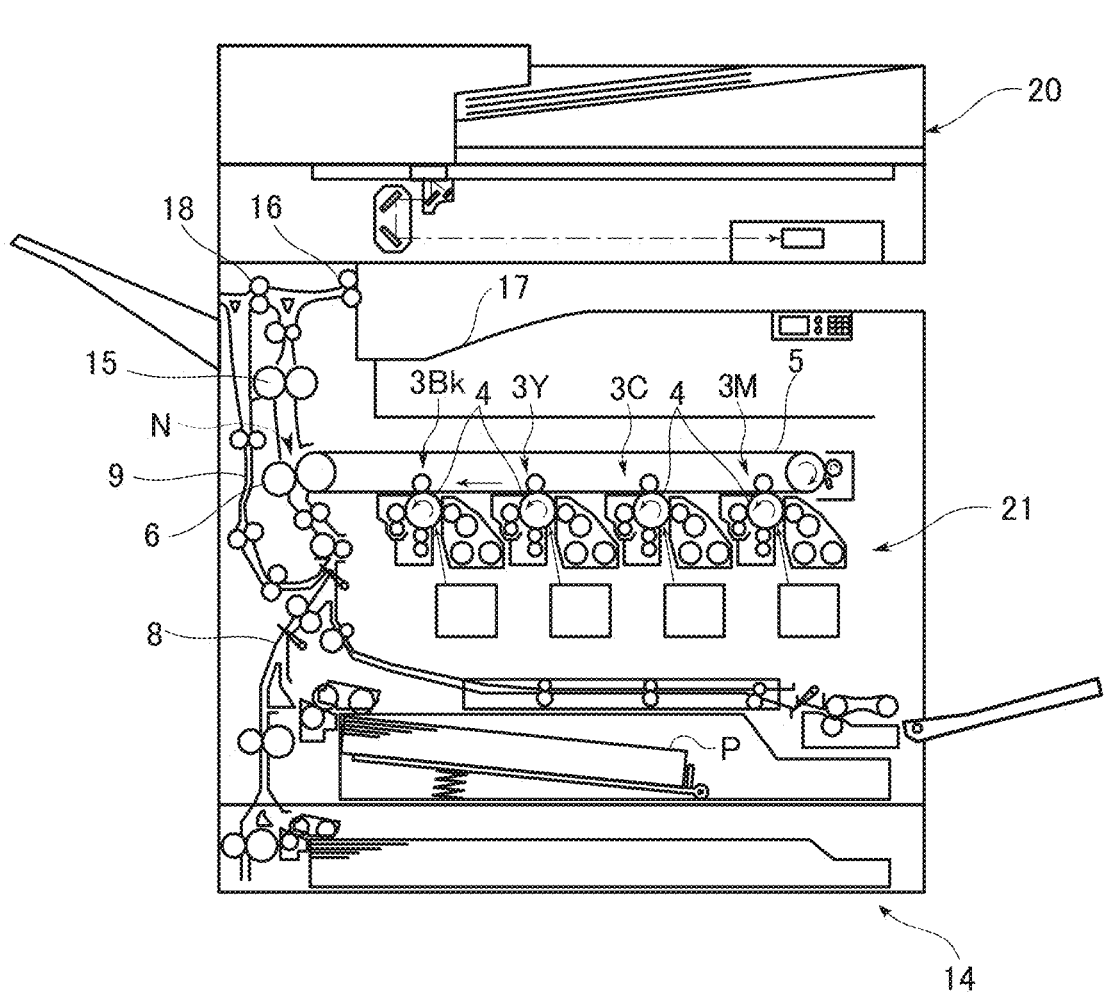
FIG. 1 is a cross-sectional view showing an image forming apparatus, incorporated with an image reading apparatus according to a first embodiment of the present invention.

FIG. 1 is a cross-sectional view showing an image forming apparatus 10, incorporated with an image reading apparatus 20 according to a first embodiment of the present invention. As shown in FIG. 1, the image forming apparatus 10 includes the image reading apparatus 20 and an image forming device 21.

The image reading apparatus 20 includes an image sensor (CCD sensor or contact image sensor) that optically reads an image of a document. The image reading apparatus 20 converts an analog output from the image sensor into a digital signal, and generates image data representing the image of the document.

The image forming device 21 serves to print the image represented by the image data, on a recording sheet. The image forming device 21 includes an image forming unit 3M for magenta, an image forming unit 3C for cyan, an image forming unit 3Y for yellow, and an image forming unit 3Bk for black. In each of the image forming units 3M, 3C, 3Y, and 3Bk, the surface of a photoconductor drum 4 is uniformly charged and exposed, to thereby form an electrostatic latent image on the surface of the photoconductor drum 4, and then the electrostatic latent image on the surface of the photoconductor drum 4 is developed into a toner image, which is transferred to an intermediate transfer belt 5. As result, a colored toner image is formed on the intermediate transfer belt 5. The colored toner image is transferred, as secondary transfer, to the recording sheet P transported from a sheet feeding device 14 along a first transport route 8, at a nip region N between the intermediate transfer belt 5 and a secondary transfer roller 6.

A fixing device 15 heats and presses the recording sheet P, to fix the toner image onto the recording sheet P, by thermal compression. A delivery roller 16 delivers the recording sheet P to an output tray 17.

When the image of the document is to be also printed on the back face of the recording sheet P, the image forming apparatus 10 performs switchback transport, including transporting the recording sheet P to the delivery roller 16 communicating with the output tray 17, stopping the delivery roller 16 once, and causing the delivery roller 16 to rotate reversely. The image forming apparatus 10 returns the recording sheet P to the first transport route 8, from a transport roller 18 through a second transport route 9, thereby reversing the front and back faces of the recording sheet P. Then the image forming apparatus 10 causes the image forming device 21 to form an image of the document on the back face of the recording sheet P, and delivers the recording sheet P to the output tray 17, through the delivery roller 16.

Figure 2:
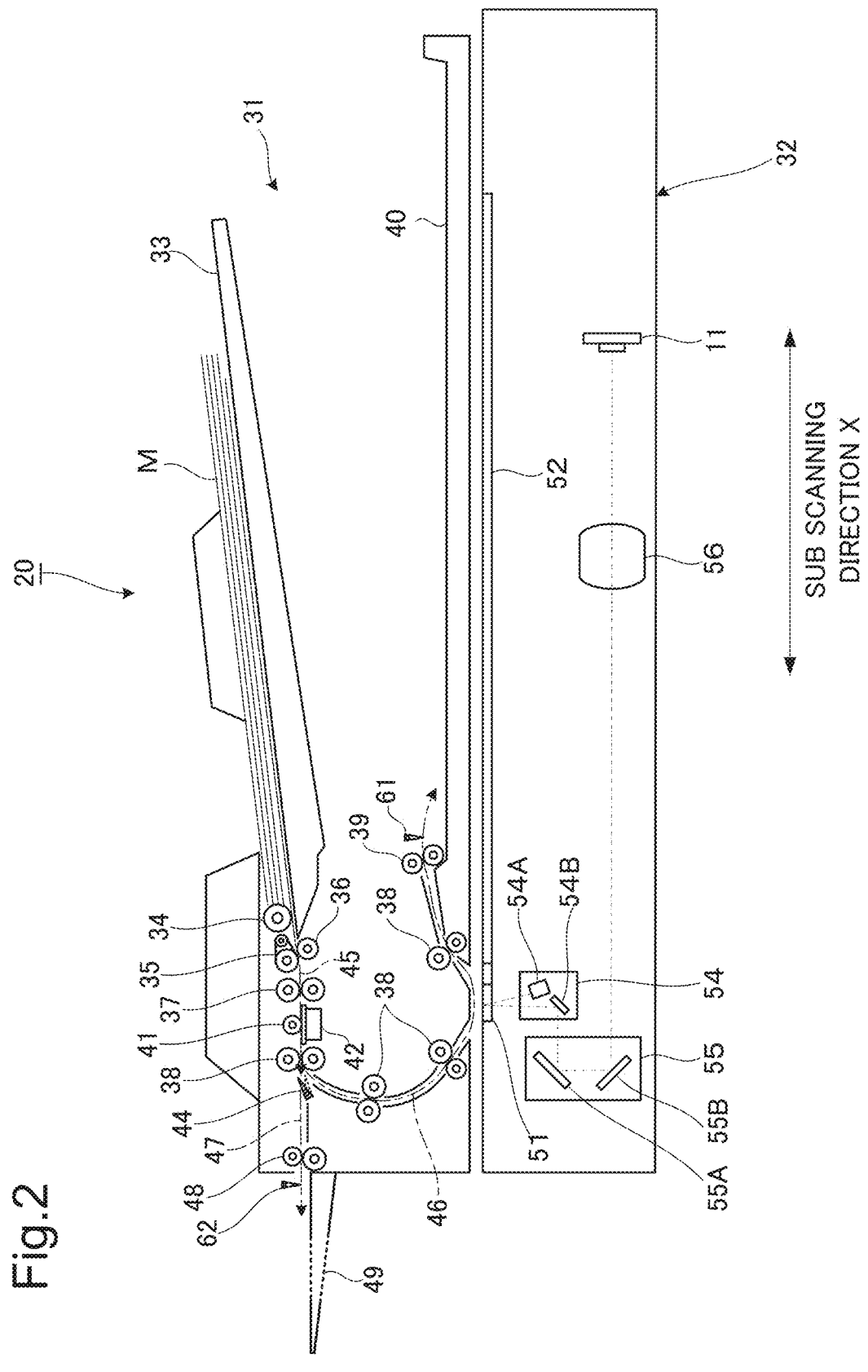
FIG. 2 is a cross-sectional view showing the image reading apparatus.
Figure 3:
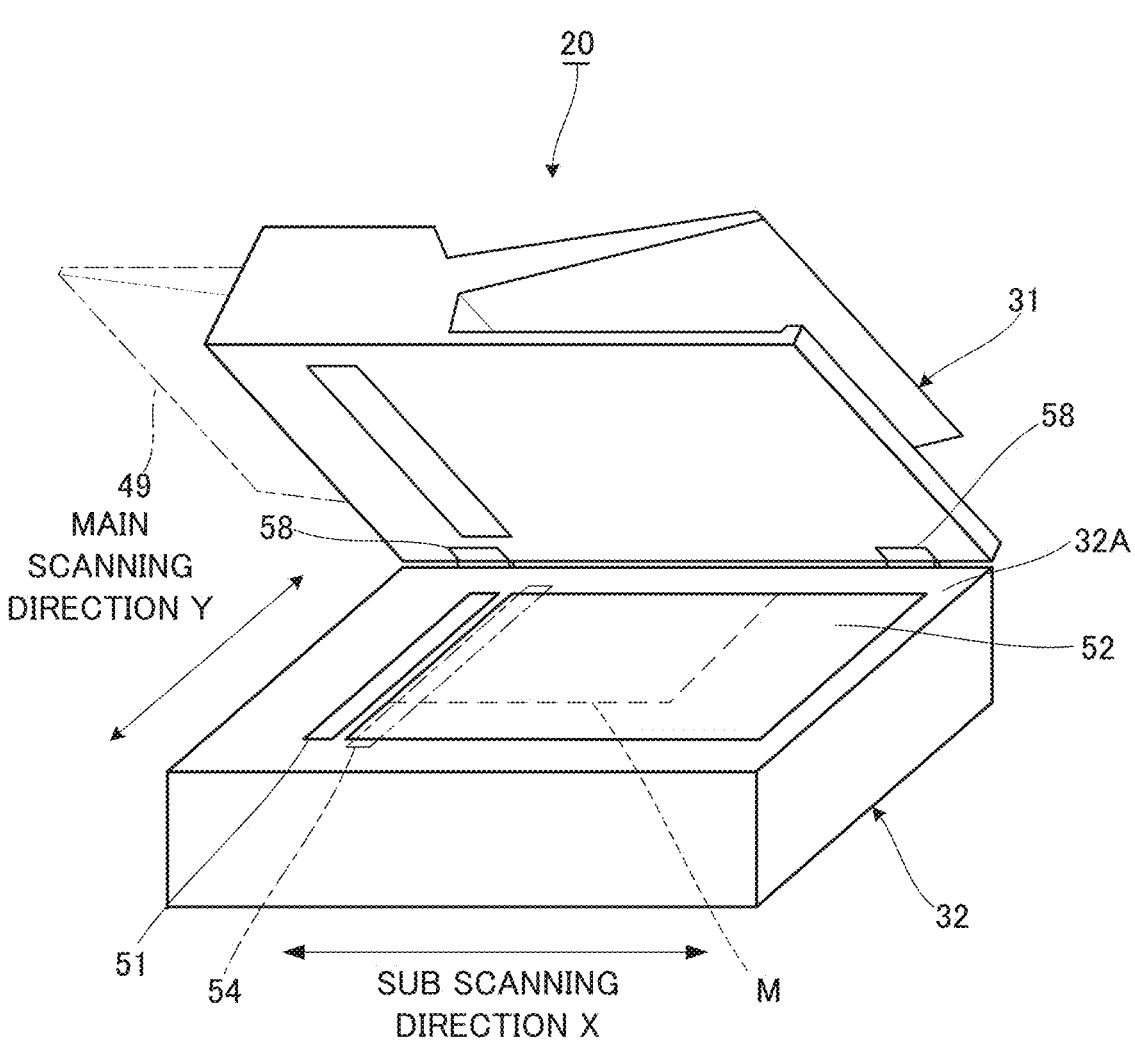
FIG. 3 is a perspective view showing the appearance of the image reading apparatus.

Hereunder, the image reading apparatus 20 will be described. FIG. 2 is a cross-sectional view showing the image reading apparatus 20. FIG. 3 is a perspective view showing the appearance of the image reading apparatus 20. FIG. 3 illustrates the state where the document transport device 31 is open.

As shown in FIG. 2 and FIG. 3, the image reading apparatus 20 includes a document transport device 31 and a reading device 32. The document transport device 31 includes a document tray 33, a feeding roller 34, a transport belt 35, a retard roller 36, a resist roller 37, a plurality of transport rollers 38, a first discharge roller 39, a first discharge tray 40, a contact image sensor (CIS) 42, a second discharge roller 48, a second discharge tray 49, and sheet sensors 61, 62.

The contact image sensor 42 corresponds to the second image sensor in the disclosure. Hereinafter, the contact image sensor 42 will be referred to as CIS 42.

In the document transport device 31, when a document M is placed on the document tray 33, the feeding roller 34 draws out the document M from the document tray 33. The document M is delivered to a common transport route 45, through between the transport belt 35 and the retard roller 36. Then the document M is transported, either through a first transport route 46 which is curved, or a second transport route 47 which is linear.

A switching nail 44 (exemplifying the switching device in the disclosure) is provided at the branch point between the first transport route 46 and the second transport route 47. The shaft of the switching nail 44 attached to the left end thereof is made to reciprocatively rotate over a predetermined range, by an actuator. Accordingly, the distal end portion of the switching nail 44 is oriented obliquely upward or in the horizontal direction. When the distal end portion of the switching nail 44 is oriented obliquely upward, the document M is guided to the first transport route 46, from the common transport route 45. When the distal end portion of the switching nail 44 is oriented in the horizontal direction, the document M is guided to the second transport route 47, from the common transport route 45.

Through the common transport route 45, the document M is transported from the resist roller 37, through between the first CIS 42 and a shading roller 41, and reaches the switching nail 44. The CIS 42 reads the image on the downwardly oriented face of the document M passing through between the CIS 42 and a shading roller 41.

Through the first transport route 46, the document M is guided downward by the switching nail 44, and transported to a first platen glass 51. The document M passes over the first platen glass 51, and is discharged to the first discharge tray 40, by the first discharge roller 39.

Through the second transport route 47, the document M is guided in the horizontal direction by the switching nail 44, and discharged to the second discharge tray 49, by the second discharge roller 48.

The reading device 32 includes the first platen glass 51, a second platen glass 52, a carriage 54, an optical unit 55, a condenser lens 56, and a CCD sensor 11. The CCD sensor 11 corresponds to the first image sensor in the disclosure.

In the reading device 32, the carriage 54 includes a light source 54A that emits light to the document, and a mirror 54B that reflects the light reflected by the document M. The optical unit 55 includes a mirror 55A and a mirror 55B. The mirror 55A reflects the light reflected by the mirror 54B of the carriage 54, generally vertically downward. The mirror 55B reflects the light reflected by the mirror 55A generally horizontally, thus guiding the light to the CCD sensor 11 through the condenser lens 56.

The carriage 54 and the optical unit 55 are configured to reciprocate, along a rail, in a sub scanning direction X orthogonal to a main scanning direction Y. The carriage 54 and the optical unit 55 are driven by a known drive mechanism based on a stepping motor, so as to move in the sub scanning direction X, maintaining a predetermined speed relation.

Two hinges 58 are provided with a spacing between each other, along one end portion of the top face 32A of the reading device 32. These hinges 58 serve to openably support the document transport device 31. Such a configuration enables a user to open or close the document transport device 31.

The image reading apparatus 20 is configured to execute, under the control of a controller 29 (see FIG. 6), four reading modes for reading the image of the document M, namely a fixed document reading mode, a moving document duplex reading mode, a first moving document simplex reading mode, and a second moving document simplex reading mode. One of these reading modes is selected by the user, and the controller 29 causes the image reading apparatus 20 to read the image of the document M, in the selected reading mode.

In the fixed document reading mode, the image on the downwardly oriented front face (face to be read), of the document M placed on the second platen glass 52, is read. In the fixed document reading mode, the CCD sensor 11 of the reading device 32 reads the image on the front face of the document M, through the second platen glass 52.

When the fixed document reading mode is selected, the user opens the document transport device 31, thereby exposing the second platen glass 52 of the reading device 32, and places the document M, with the front face oriented downward, on the second platen glass 52. Then the user closes the document transport device 31, thereby holding the document M placed on the second platen glass 52, with the document transport device 31. The reading device 32 emits the light of the light source 54A of the carriage 54, to the surface of the document M through the second platen glass 52, while moving the carriage 54 and the optical unit 55 in the sub scanning direction X, maintaining the predetermined speed relation between each other. The light reflected by the surface of the document M is reflected by the mirror 54B of the carriage 54. The light reflected by the mirror 54B is reflected by the mirror 55A and the mirror 55B of the optical unit 55, thus to be incident upon the CCD sensor 11, through the condenser lens 56. The CCD sensor 11 repeatedly reads the image on the front face of the document M, in the main scanning direction Y (orthogonal to the sub scanning direction X).

In the moving document duplex reading mode, the images on the respective faces of the document M placed on the document tray 33 are read, while the document M is being transported. In the moving document duplex reading mode, the document M is transported from the document tray 33, through the common transport route 45 and the first transport route 46, and to the first discharge tray 40, so that the CIS 42 reads the image on the downwardly oriented back face of the document M being transported through the common transport route 45, and the CCD sensor 11 of the reading device 32 reads the image on the front face of the document M, through the first platen glass 51.

Figure 4:
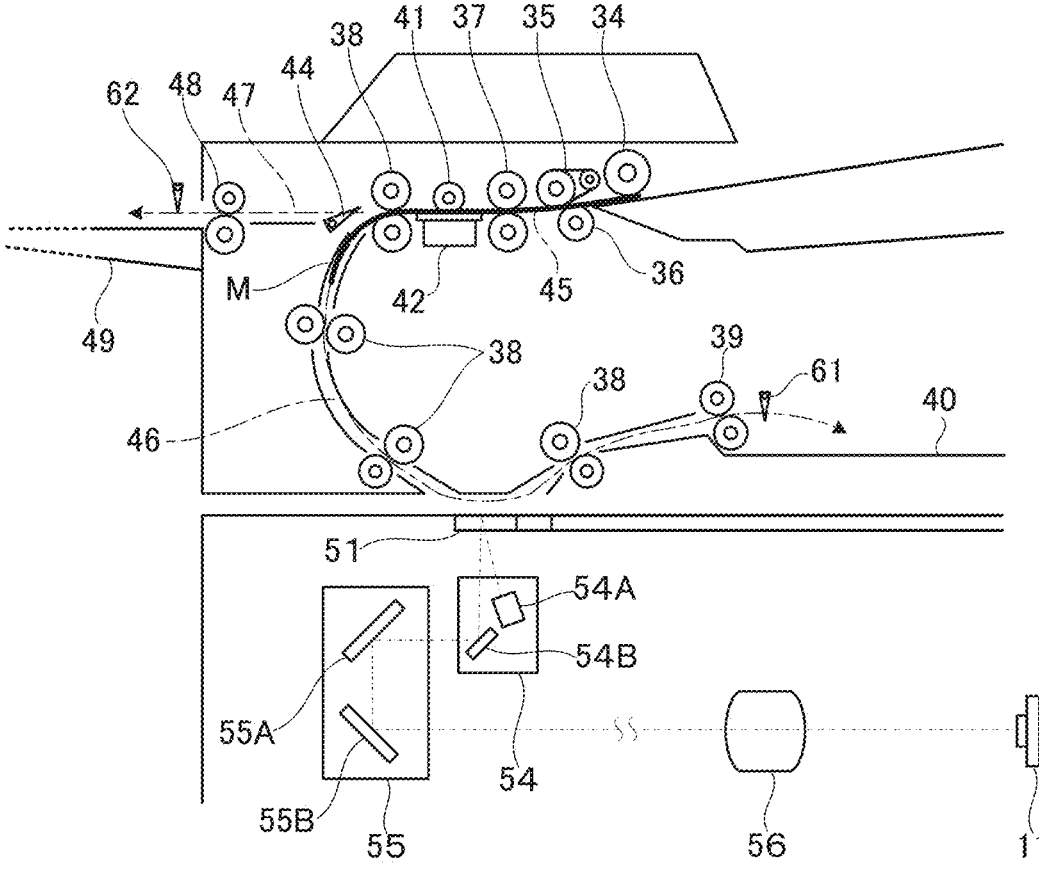
FIG. 4 is an enlarged schematic drawing showing a transport route of a document.

When the moving document duplex reading mode is selected, the user places the document M with the front face oriented upward, on the document tray 33 with the document transport device 31 kept closed, as shown in FIG. 4. The feeding roller 34 draws out the document M from the document tray 33. The document M is transported through the common transport route 45 past the CIS 42, guided by the switching nail 44 from the common transport route 45 to the first transport route 46, and passes over the first platen glass 51, thus to be discharged to the first discharge tray 40. The CIS 42 reads the image on the back face, oriented downward, of the document M passing through between the CIS 42 and the shading roller 41. The reading device 32 emits the light of the light source 54A of the carriage 54, to the surface of the document M, through the first platen glass 51. The light reflected by the surface of the document M is sequentially reflected by the mirrors 54B, 55A, and 55B, thus to be incident upon the CCD sensor 11, through the condenser lens 56. The CCD sensor 11 reads the image on the surface of the document M.

In the first moving document simplex reading mode, the image on the upper face of the document M placed on the document tray 33 (face to be read) is read, while the document M is being transported. In the first moving document simplex reading mode, the document M is transported from the document tray 33, through the common transport route 45 and the first transport route 46, and to the first discharge tray 40, so that the CCD sensor 11 of the reading device 32 reads the image on the front face of the document M through the first platen glass 51.

When the first moving document simplex reading mode is selected, the user places the document M with the front face oriented upward, on the document tray 33 with the document transport device 31 kept closed, as shown in FIG. 4. The feeding roller 34 draws out the document M from the document tray 33. The document M is transported through the common transport route 45, guided by the switching nail 44 from the common transport route 45 to the first transport route 46, and passes over the first platen glass 51, thus to be discharged to the first discharge tray 40. The reading device 32 sets the carriage 54 and the optical unit 55 at respective predetermined positions on the lower side of the first platen glass 51, and emits the light of the light source 54A of the carriage 54, to the surface of the document M, through the first platen glass 51. The light reflected by the surface of the document M is sequentially reflected by the mirrors 54B, 55A, and 55B, thus to be incident upon the CCD sensor 11, through the condenser lens 56. The CCD sensor 11 repeatedly reads the image on the surface of the document M, in the main scanning direction Y.

In the second moving document simplex reading mode, the image on the downwardly oriented face of the document M placed on the document tray 33 (face to be read: opposite to the face of the document to be read in the first moving document simplex reading mode) is read, while the document M is being transported. In the second moving document simplex reading mode, the document M is transported from the document tray 33, through the common transport route 45 and the second transport route 47, and to the second discharge tray 49, so that the CIS 42 reads the image on the downwardly oriented front face of the document M.

Figure 5:
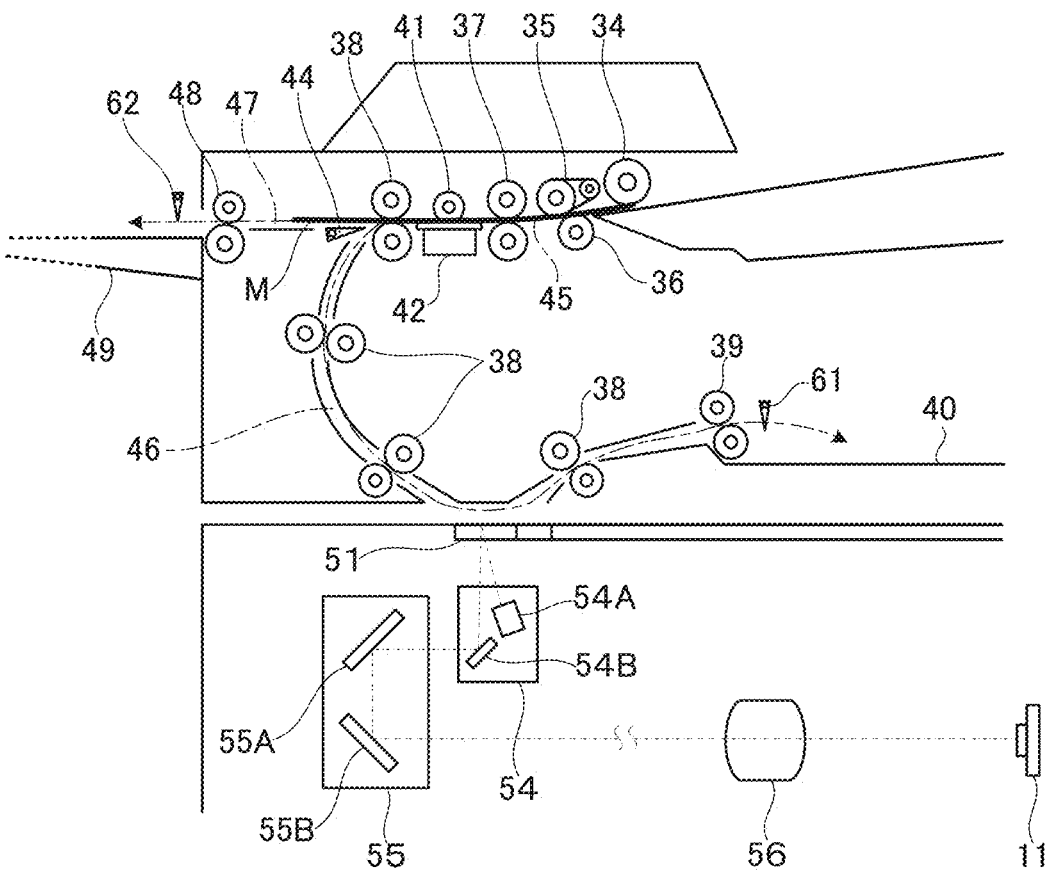
FIG. 5 is an enlarged schematic drawing showing another transport route of the document.

When the second moving document simplex reading mode is selected, the user places the document M with the front face oriented downward, on the document tray 33 with the document transport device 31 kept closed, as shown in FIG. 5. The feeding roller 34 draws out the document M from the document tray 33. The document M is transported through the common transport route 45 past the CIS 42, guided by the switching nail 44 from the common transport route 45 to the second transport route 47, and discharged to the second discharge tray 49. The CIS 42 repeatedly reads the image on the downwardly oriented front face of the document M, passing through between the CIS 42 and the shading roller 41, in the main scanning direction Y.

Figure 6:
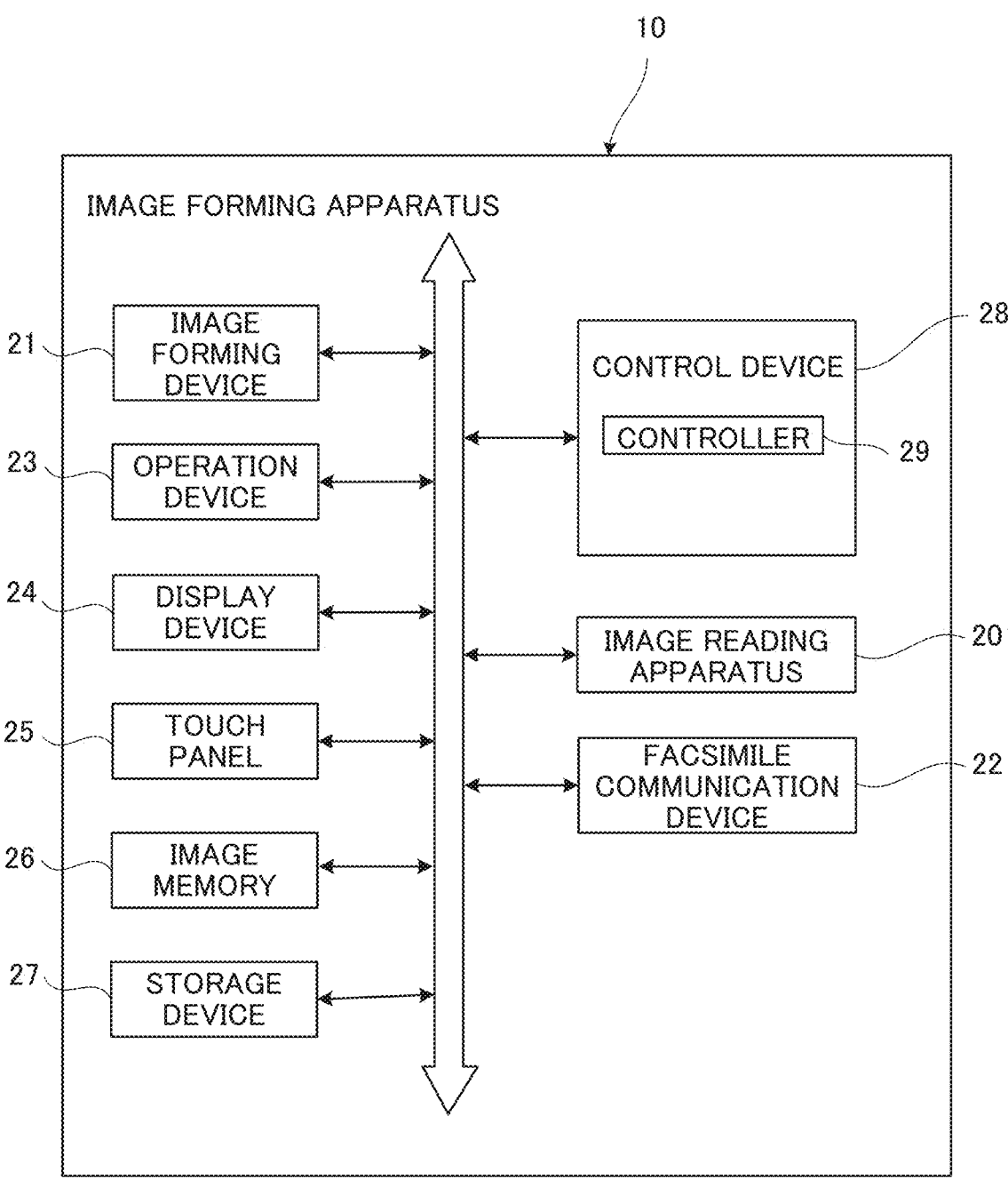
FIG. 6 is a block diagram showing an essential internal configuration of the image forming apparatus.

FIG. 6 is a functional block diagram showing an internal configuration of the image forming apparatus 10. As shown in FIG. 6, the image forming apparatus 10 includes an image reading apparatus 20, the image forming device 21, a facsimile communication device 22, an operation device 23, a display device 24, a touch panel 25, an image memory 26, a storage device 27, and a control device 28. The mentioned components are configured to transmit and receive data and signals to and from each other, via a bus.

The facsimile communication device 22 includes a codec, a modem, and a network control unit (NCU). The facsimile communication device 22 transmits and receives the facsimile data, through the public telephone network. The facsimile communication device 22 transmits and receives image data representing the image of the document, to and from another image forming apparatus or facsimile machine, via the network. The facsimile communication device 22 corresponds to the image communication device in the present invention.

The operation device 23 includes physical keys such as a tenkey, an enter key, and a start key. The operation device 23 receives inputs of various instructions from the user. The display device 24 is, for example, constituted of a liquid crystal display (LCD) or an organic light-emitting diode (OLED) display.

The touch panel 25 is overlaid on the screen of the display device 24. The touch panel 25 is based on a resistive film or electrostatic capacitance. The touch panel 25 detects a contact (touch) of the user's finger made thereon, along with the touched position, and outputs a detection signal indicating the coordinate of the touched position, to the controller 29 of the control device 28.

The image memory 26 is for temporarily storing the image data representing the image of the document M, read by the CCD sensor 11 and the second CIS 42 of the image reading apparatus 20.

The storage device 27 is a large-capacity storage device such as a solid-state drive (SSD) or a hard disk drive (HDD). The storage device 27 contains various application programs and various types of data.

The control device 28 includes a processor, a random-access memory (RAM), a read-only memory (ROM), and so forth. The processor is, for example, a central processing unit (CPU), an application specific integrated circuit (ASIC), or a micro processing unit (MPU). The control device 28 serves as the controller 29, when the processor executes a control program stored in the ROM or the storage device 27.

The controller 29 executes overall control of the image forming apparatus 10. The controller 29 is connected to the image reading apparatus 20, the image forming device 21, the operation device 23, the display device 24, the touch panel 25, the image memory 26, and the storage device 27. The controller 29 controls the operation of the components cited above, and transmits and receives signals and data to and from those components.

The controller 29 serves as a processing device that executes various processings necessary for the image forming job by the image forming apparatus 10. The controller 29 accepts instructions to execute the operation, on the basis of a detection signal outputted from the touch panel 25, or an operation of the user performed on the physical key of the operation device 23. For example, the controller 29 accepts a user's touch operation made through the touch panel 25, on a graphical user interface (GUI) displayed on the screen of the display device 24. The controller 29 also controls the communicating operation of the facsimile communication device 22, and the displaying operation of the display device 24.

The controller 29 controls the motor, the actuator, and a clutch for driving the feeding roller 34, the transport belt 35, the resist roller 37, the transport rollers 38, the shading roller 41, the first discharge roller 39, the second discharge roller 48, and the switching nail 44 in the document transport device 31, thereby operating these components. Through such operation, the controller 29 causes the document M to be drawn out from the document tray 33, and transported through the common transport route 45, and one of the first transport route 46 and the second transport route 47.

When the user selects, for example, the facsimile communication by operating the GUI displayed on the display device 24 in the image forming apparatus 10, the controller 29 receives the instruction to stand by for the facsimile communication. When the user further selects one of the fixed document reading mode, the moving document duplex reading mode, the first moving document simplex reading mode, and the second moving document simplex reading mode, by operating the operation device 23 or the touch panel 25, the controller 29 receives the reading instruction in the selected mode. In the case where the controller 29 has received the reading instruction in the fixed document reading mode, the user places the document M on the second platen glass 52, with the front face oriented downward. In the case where the controller 29 has received the reading instruction in the moving document duplex reading mode or the first moving document simplex reading mode, the user places the document M on the document tray 33, with the front face (face to be read) oriented upward. In the case where the controller 29 has received the reading instruction in the second moving document simplex reading mode, the user places the document M on the document tray 33, with the front face (face to be read) oriented downward.

Upon deciding that the fixed document reading mode has been selected, the controller 29 controls the reading device 32, so as to cause the CCD sensor 11 of the reading device 32 to read the image on the front face of the document M on the second platen glass 52, and store the image data representing the image of the front face of the document M, in the image memory 26. Here, in the case where the controller 29 decides that the copying of the document has been selected, according to the instruction received via the operation device 23, the controller 29 inputs the image data representing the image of the front face of the document M, from the image memory 26 to the image forming device 21, and causes the image forming device 21 to form the image of the front face of the document M, represented by the image data inputted, on the recording sheet.

In the case where the controller 29 decides that the facsimile communication of the document has been selected, according to the instruction received via the operation device 23, and where the facsimile number of the destination has been inputted, the controller 29 inputs the image data representing the image of the front face of the document M, from the image memory 26 to the facsimile communication device 22, and causes the facsimile communication device 22 to transmit the image data to the facsimile number of the destination, through the telephone network. Upon receipt of the call response from the facsimile machine on the receiving end, the controller 29 causes the facsimile communication device 22 to transmit the image data representing the image of the front face of the document M, to the facsimile machine on the receiving end.

Upon deciding that the duplex reading mode has been selected, according to the instruction received via the operation device 23, the controller 29 controls the document transport device 31, the CIS 42, and the reading device 32, so as to transport the document M from the document tray 33, and through the common transport route 45, the first transport route 46, and the first discharge tray 40 (see FIG. 4). The controller 29 causes the CIS 42 to read the image on the downwardly oriented back face of the document M, and causes the CCD sensor 11 of the reading device 32 to read the image on the front face of the document M, through the first platen glass 51. The controller 29 then stores the image data, respectively representing the image on the front face and the image on the back face of the document M, in the image memory 26.

In the case where the controller 29 decides that the copying of the document has been selected, according to the instruction received via the operation device 23, the controller 29 inputs the image data respectively representing the image on the front face and the image on the back face of the document M, from the image memory 26 to the image forming device 21, and causes the image forming device 21 to form the image of the front face and the image of the back face of the document M, represented by the image data inputted, on the front and back faces of the recording sheet.

In the case where the controller 29 decides that the facsimile communication of the document has been selected, according to the instruction received via the operation device 23, and where the facsimile number of the destination has been inputted, the controller 29 inputs the image data respectively representing the image on the front face and the image on the back face of the document M, from the image memory 26 to the facsimile communication device 22, and causes the facsimile communication device 22 to transmit the image data to the facsimile number of the destination, through the telephone network. Upon receipt of the call response from the facsimile machine on the receiving end, the controller 29 causes the facsimile communication device 22 to transmit the image data respectively representing the image on the front face and the image on the back face of the document M, to the facsimile machine on the receiving end.

Upon deciding that the first moving document simplex reading mode has been selected, according to the instruction received via the operation device 23, the controller 29 controls the document transport device 31 and the reading device 32, so as to transport the document M from the document tray 33, and through the common transport route 45, the first transport route 46, and the first discharge tray 40 (see FIG. 4). The controller 29 causes the CCD sensor 11 of the reading device 32 to read the image on the front face of the document M, through the first platen glass 51, and store the image data representing the image of the front face of the document M, in the image memory 26.

Further, upon deciding that the copying of the document has been selected, according to the instruction received via the operation device 23, the controller 29 inputs the image data representing the image of the front face of the document M, from the image memory 26 to the image forming device 21, and causes the image forming device 21 to form the image of the front face of the document M, represented by the image data inputted, on the recording sheet. Upon deciding, in contrast, that the facsimile communication of the document has been selected, according to the instruction received via the operation device 23, and that the facsimile number of the destination has been inputted, the controller 29 causes the facsimile communication device 22 to call the facsimile number of the destination, and transmit the image data to the facsimile number of the destination.

Upon deciding, according to the instruction received via the operation device 23, that the second moving document simplex reading mode has been selected, and that the copying of the document has been selected, the controller 29 controls the document transport device 31 and the CIS 42, so as to transport the document M from the document tray 33, and through the common transport route 45, the second transport route 47, and the second discharge tray 49 (see FIG. 5). The controller 29 causes the CIS 42 to read the image on the downwardly oriented front face (face to be read) of the document M, and store the image data representing the image of the front face of the document M, in the image memory 26. The controller 29 causes the image forming device 21 to form the image of the front face of the document M, represented by the image data, on the recording sheet.

Upon deciding, according to the instruction received via the operation device 23, that the second moving document simplex reading mode has been selected, and that the facsimile communication of the document has been selected, the controller 29 restricts the document transport device 31 from transporting the document M, the CIS 42 from reading the image of the document M, and the facsimile communication device 22 from executing the facsimile communication of the document.

As described above, in the case where the copying or facsimile communication of the document has been selected, and where one of the fixed document reading mode, the moving document duplex reading mode, and the first moving document simplex reading mode has been selected, the image on the front face, or images on both faces (image on the front face and image on the back face), of the document M are read, and the image on the front face, or images on both faces of the document M are formed on the recording sheet or transmitted via facsimile, under the control of the controller 29.

In the case where the copying of the document, and the second moving document simplex reading mode have been selected, the image on the front face of the document M is read, and formed on the recording sheet, under the control of the controller 29.

On the other hand, in the case where the facsimile communication of the document and the second moving document simplex reading mode have been selected, the reading of the image of the document, and the facsimile communication of the document are restricted, under the control of the controller 29.

Now, upon selecting the moving document duplex reading mode or the first moving document simplex reading mode, the user places the document M on the document tray 33, with the front face (face to be read) oriented upward. Upon selecting the second moving document simplex reading mode, the user places the document M on the document tray 33, with the front face (face to be read) oriented downward. Thus, it is only when the second moving document simplex reading mode is selected, that the document M is placed on the document tray 33 with the front face (face to be read) oriented downward.

In other words, the document M is placed on the document tray 33 with the front face oriented upward more frequently, compared with the case where the document M is placed with the front face oriented downward. Accordingly, the user may commit an incorrect operation of placing the document M on the document tray 33, with the front face oriented upward, despite having selected the second moving document simplex reading mode. When such an incorrect operation occurs, the downwardly oriented back face of the document M is read by the CIS 42.

When the user selects the copying of the document and the second moving document simplex reading mode, the image on the back face of the document M is formed on the recording sheet. Therefore, the user can be aware of his/her incorrect operation, in view of the image formed on the recording sheet. However, when the user selects the facsimile communication of the document and the second moving document simplex reading mode, the image on the back face of the document M is only transmitted to the destination, and not formed on the recording sheet or displayed on the display device 24. As result, the user is unable to recognize his/her incorrect operation.

In the first embodiment, therefore, the controller 29 restricts the reading and the facsimile communication of the image of the document, when the facsimile communication of the document and the second moving document simplex reading mode are selected.

Referring now to a flowchart shown in FIG. 7, description will be given hereunder, regarding a control process in the copying and communication control operation, according to the first embodiment, to be performed to execute the copying or facsimile communication of the document, or to restrict the same, on the basis of the selection of one of the copying and the facsimile communication of the document, and one of the fixed document reading mode, the moving document duplex reading mode, the first moving document simplex reading mode, and the second moving document simplex reading mode.

The user inputs an instruction to select the copying or facsimile communication of the document, by operating the GUI displayed on the display device 24, or the operation device 23. Upon selecting the facsimile communication, the user also inputs the facsimile number of the destination. Further, the user inputs an instruction to select one of the fixed document reading mode, the moving document duplex reading mode, the first moving document simplex reading mode, and the second moving document simplex reading mode.

The controller 29 decides which of the copying and the facsimile communication of the document has been selected, according to the operation performed on the GUI or the operation device 23 (step S101). When the facsimile communication is selected, the controller 29 receives the facsimile number of the destination, inputted by the user.

Upon deciding that the copying of the document has been selected (CP at step S101), according to the instruction received via the GUI or the operation device 23, the controller 29 decides which of the fixed document reading mode, the moving document duplex reading mode, the first moving document simplex reading mode, and the second moving document simplex reading mode has been selected (step S102), according to the instruction received via the GUI or the operation device 23.

Upon deciding that the fixed document reading mode has been selected ("FIXED" at step S102), according to the instruction received via the GUI or the operation device 23, the controller 29 causes the display device 24 to display a message urging the user to place the document M on the second platen glass 52, with the front face oriented downward, and to press the start key in the operation device 23. In view of such a message, the user places the document M on the second platen glass 52, with the front face oriented downward, and presses the start key.

Upon receipt of the document reading instruction, in response to the operation performed on the start key by the user, the controller 29 controls the reading device 32, so as to cause the CCD sensor 11 of the reading device 32 to read the image on the front face of the document M on the second platen glass 52 (step S103). The controller 29 then stores the image data representing the image on the front face of the document M, in the image memory 26, and causes the image forming device 21 to form the image on the front face of the document M, represented by the image data, on the recording sheet (step S104).

Upon deciding that the moving document duplex reading mode has been selected ("DUPLEX" at step S102), the controller 29 causes the display device 24 to display a message urging the user to place the document M on the document tray 33, with the front face oriented upward, and to press the start key in the operation device 23. In view of such a message, the user places the document M on the document tray 33, with the front face oriented upward, and presses the start key.

Upon receipt of the document reading instruction, in response to the operation performed on the start key, the controller 29 controls the document transport device 31, the CIS 42, and the reading device 32, so as to transport the document M from the document tray 33, and through the common transport route 45, the first transport route 46, and the first discharge tray 40 (see FIG. 4). The controller 29 causes the CIS 42 to read the image on the downwardly oriented back face of the document M, and causes the CCD sensor 11 of the reading device 32 to read the image on the front face of the document M, through the first platen glass 51 (step S105). The controller 29 stores the image data respectively representing the image on the front face and the image on the back face of the document M, in the image memory 26, and causes the image forming device 21 to form the image on the front face and the image on the back face of the document M, represented by the image data, on the front and back faces of the recording sheet, respectively (step S106).

Upon deciding that the first moving document simplex reading mode has been selected ("FIRST SIMPLEX" at step S102), the controller 29 causes the display device 24 to display a message urging the user to place the document M on the document tray 33, with the front face oriented upward, and to press the start key in the operation device 23. In view of such a message, the user places the document M on the document tray 33, with the front face oriented upward, and presses the start key.

Upon receipt of the document reading instruction, in response to the operation performed on the start key, the controller 29 controls the document transport device 31 and the reading device 32, so as to transport the document M from the document tray 33, and through the common transport route 45, the first transport route 46, and the first discharge tray 40 (see FIG. 4). The controller 29 causes the CCD sensor 11 of the reading device 32 to read the image on the front face of the document M, through the first platen glass 51 (step S107). The controller 29 then stores the image data representing the image on the front face of the document M, in the image memory 26, and causes the image forming device 21 to form the image on the front face of the document M, represented by the image data, on the recording sheet (step S108).

Upon deciding that the second moving document simplex reading mode has been selected ("SECOND SIMPLEX" at step S102), the controller 29 causes the display device 24 to display a message urging the user to place the document M on the document tray 33, with the front face oriented downward, and to press the start key in the operation device 23. In view of such a message, the user places the document M on the document tray 33, with the front face oriented downward, and presses the start key.

Upon receipt of the document reading instruction, in response to the operation performed on the start key, the controller 29 controls the document transport device 31 and the CIS 42, so as to transport the document M from the document tray 33, and through the common transport route 45, the second transport route 47, and the second discharge tray 49 (see FIG. 5). The controller 29 causes the CIS 42 to read the image on the downwardly oriented front face of the document M (step S109). The controller 29 stores the image data representing the image on the front face of the document M, in the image memory 26, and causes the image forming device 21 to form the image on the front face of the document M, represented by the image data, on the recording sheet, respectively (step S110).

As described above, when the copying of the document is selected, any one of the fixed document reading mode, the moving document duplex reading mode, the first moving document simplex reading mode, and the second moving document simplex reading mode can be executed, under the control of the controller 29.

In contrast, upon deciding that the facsimile communication of the document has been selected, and that the selected reading mode and the facsimile number of the destination have been inputted ("FAX" at step S101), according to the instruction received via the GUI or the operation device 23, controller 29 decides which of the fixed document reading mode, the moving document duplex reading mode, the first moving document simplex reading mode, and the second moving document simplex reading mode has been selected (step S111).

Upon deciding that the fixed document reading mode has been selected ("FIXED" at step S111), the controller 29 causes the display device 24 to display a message urging the user to place the document M on the second platen glass 52, with the front face oriented downward, and to press the start key in the operation device 23. In view of such a message, the user places the document M on the second platen glass 52, with the front face oriented downward, and presses the start key.

Upon receipt of the document reading instruction, in response to the operation performed on the start key, the controller 29 controls the reading device 32, so as to cause the CCD sensor 11 of the reading device 32 to read the image on the front face of the document M on the second platen glass 52 (step S112). The controller 29 then stores the image data representing the image on the front face of the document M, in the image memory 26, and causes the facsimile communication device 22 to call the facsimile number of the destination, inputted at step S101, and transmit the image data representing the image on the front face of the document M, to the facsimile machine on the receiving end (step S113).

Upon deciding that the moving document duplex reading mode has been selected ("DUPLEX" AT step S111), the controller 29 causes the display device 24 to display a message urging the user to place the document M on the document tray 33, with the front face oriented upward, and to press the start key in the operation device 23. In view of such a message, the user places the document M on the document tray 33, with the front face oriented upward, and presses the start key.

Upon receipt of the document reading instruction, in response to the operation performed on the start key, the controller 29 controls the document transport device 31, the CIS 42, and the reading device 32, so as to transport the document M from the document tray 33, and through the common transport route 45, the first transport route 46, and the first discharge tray 40 (see FIG. 4). The controller 29 causes the CIS 42 to read the image on the downwardly oriented back face of the document M, and causes the CCD sensor 11 of the reading device 32 to read the image on the front face of the document M, through the first platen glass 51 (step S114). The controller 29 stores the image data respectively representing the image on the front face and the image on the back face of the document M, in the image memory 26, and causes the facsimile communication device 22 to call the facsimile number of the destination, inputted at step S101, and transmit the image data respectively representing the image on the front face and the image on the back face of the document M, to the facsimile machine on the receiving end (step S115).

Upon deciding that the first moving document simplex reading mode has been selected ("FIRST SIMPLEX" at step S111), the controller 29 causes the display device 24 to display a message urging the user to place the document M on the document tray 33, with the front face oriented upward, and to press the start key in the operation device 23. In view of such a message, the user places the document M on the document tray 33, with the front face oriented upward, and presses the start key.

Upon receipt of the document reading instruction, in response to the operation performed on the start key, the controller 29 controls the document transport device 31 and the reading device 32, so as to transport the document M from the document tray 33, and through the common transport route 45, the first transport route 46, and the first discharge tray 40 (see FIG. 4). The controller 29 causes the CCD sensor 11 of the reading device 32 to read the image on the front face of the document M, through the first platen glass 51 (step S116). The controller 29 then stores the image data representing the image on the front face of the document M, in the image memory 26, and causes the facsimile communication device 22 to call the facsimile number of the destination, inputted at step S101, and transmit the image data representing the image on the front face of the document M, to the facsimile machine on the receiving end (step S117).

Upon deciding that the second moving document simplex reading mode has been selected ("SECOND SIMPLEX" at step S111), the controller 29 inhibits the transport of the document M to the image reading apparatus 20, the reading of the image of the document M, and facsimile communication of the document by the facsimile communication device 22 (step S118).

Here, the controller 29 may be configured to reject, when the facsimile communication of the document is selected through the operation device 23, the instruction to select the second moving document simplex reading mode. In this case, the controller 29 may reject the instruction to select the second moving document simplex reading mode, inputted through the touch panel 25 and the operation device 23, for example by causing the display device 24 to gray out, when displaying the operation screen for urging the user to select the reading mode, the portion in the screen corresponding to the second moving document simplex reading mode.

In this case, the controller 29 causes the display device 24 to display, when displaying the operation screen for urging the user to select the reading mode, the portions in the screen corresponding to the fixed document reading mode, the moving document duplex reading mode, and the first moving document simplex reading mode, in the normal clear form that can be visually recognized by the user. The controller 29 can receive, via the touch panel 25 and the operation device 23, the instruction to select one of the fixed document reading mode, the moving document duplex reading mode, and the first moving document simplex reading mode.

In addition, the controller 29 may be configured to reject the instruction to select the facsimile communication, inputted through the touch panel 25 and the operation device 23, for example by causing the display device 24 to gray out, when displaying the operation screen for instructing the facsimile communication device 22 to execute the facsimile communication of the document, the portion in the screen corresponding to the facsimile communication.

With the arrangement according to the first embodiment, as described above, when the facsimile communication of the document is selected, any one of the fixed document reading mode, the moving document duplex reading mode, and the first moving document simplex reading mode can be executed under the control of the controller 29. However, the execution of the second moving document simplex reading mode is restricted.

Therefore, even though the user commits the incorrect operation, such as placing the document M on the document tray 33 with the front face oriented upward, after selecting the facsimile communication of the document and the second moving document simplex reading mode, the CIS 42 is kept from reading the image on the downwardly oriented back face of the document M, and naturally the image of the back face is not transmitted.

Second Embodiment

Hereunder, the image reading apparatus 20 according to a second embodiment of the present invention will be described. The image reading apparatus 20 according to the second embodiment is, similarly to the image reading apparatus 20 according to the first embodiment, incorporated in the image forming apparatus 10 shown in FIG. 1 and FIG. 6, and configured as illustrated in FIG. 2 to FIG. 5.

The second embodiment is similar to the first embodiment in that, when the copying or facsimile communication of the document is selected, and one of the fixed document reading mode, the moving document duplex reading mode, and the first moving document simplex reading mode is selected, the image on the front face, or the images on both faces of the document M are read, and formed on the recording sheet or transmitted via facsimile, and that when the copying of the document and the second moving document simplex reading mode are selected, the image on the downwardly oriented front face of the document M is read, and the image on the front face of the document M is formed on the recording sheet.

On the other hand, the second embodiment is different from the first embodiment in that, when the facsimile communication of the document and the second moving document simplex reading mode are selected, the controller 29 causes the CIS 42 to read the image on the downwardly oriented face of the document M, decides, each time the image on the downwardly oriented face of the document M is read, whether the downwardly oriented face is blank, assumes, upon deciding that the downwardly oriented face is not blank, that the image on the front face of the document M has been read, and causes the facsimile communication device 22 to transmit the image on the front face of the document M, but inhibits the facsimile communication of the document, upon deciding that the downwardly oriented face is blank.

Figure 8:
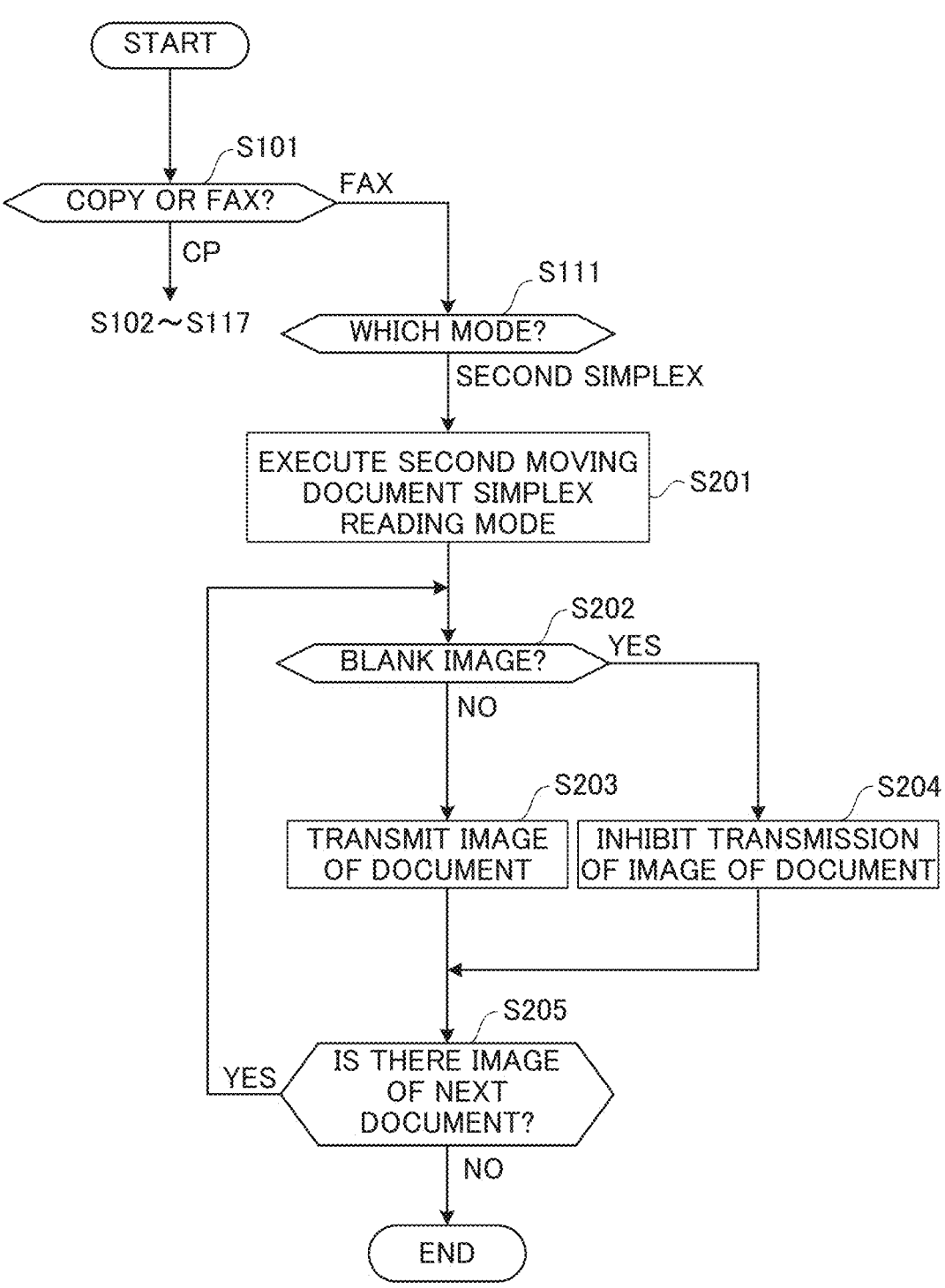
FIG. 8 is a flowchart showing a control process for copying and communication control, according to a second embodiment.

Referring now to a flowchart shown in FIG. 8, description will be given hereunder, regarding a control process in the copying and communication control operation, according to the second embodiment, to be performed to execute the copying or facsimile communication of the document, or to restrict the same, on the basis of the selection of one of the copying and the facsimile communication of the document, and one of the fixed document reading mode, the moving document duplex reading mode, the first moving document simplex reading mode, and the second moving document simplex reading mode.

Figure 7:
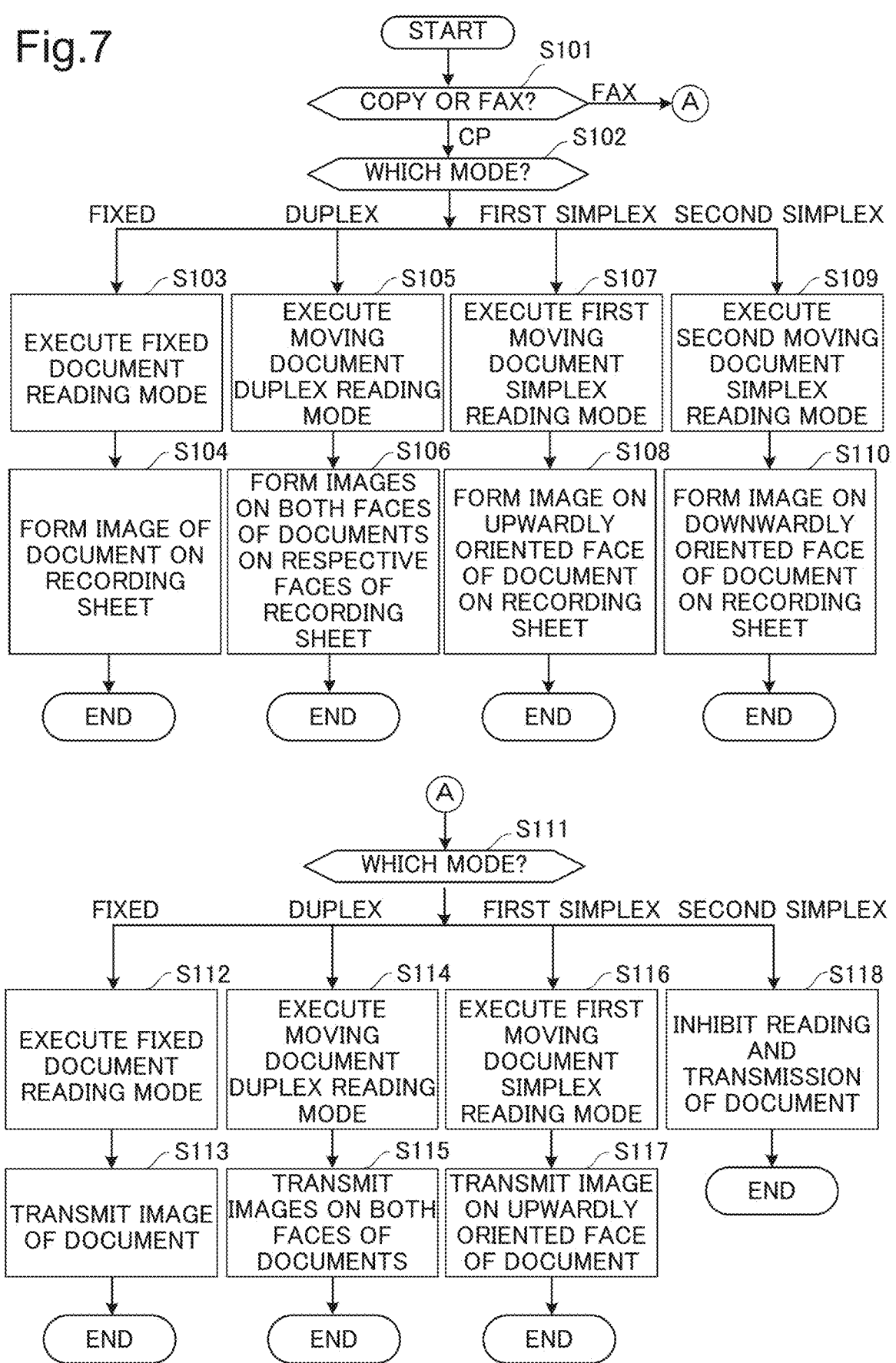
FIG. 7 is a flowchart showing a control process for copying and communication control, according to the first embodiment.

In the second embodiment, the operations from step S101 to step S117 shown in FIG. 7 are performed, as in the first embodiment. Therefore, the description of the operations from step S101 to step S117 will not be repeated.

Upon deciding that the facsimile communication of the document has been selected, and that the facsimile number of the destination has been inputted ("FAX" at step S101), and further that the second moving document simplex reading mode has been selected ("SECOND SIMPLEX" at step S111), according to the instruction received via the GUI or the operation device 23, the controller 29 causes the display device 24 to display a message urging the user to place the document M on the document tray 33, with the front face oriented downward, and to press the start key in the operation device 23. In view of such a message, the user places the document M on the document tray 33, and presses the start key.

The controller 29 receives the document reading instruction, in response to the operation performed on the start key, and controls the document transport device 31 and the CIS 42, so as to transport the document M from the document tray 33, and through the common transport route 45, the second transport route 47, and the second discharge tray 49 (see FIG. 5). The controller 29 causes the CIS 42 to read the image on the downwardly oriented face of the document M (step S201), and stores the image data representing the image on the downwardly oriented face of the document M, in the image memory 26.

At this point, the controller 29 decides, on the basis of the image data representing the image on the downwardly oriented face of the document M, stored in the image memory 26, whether the face of the document M is blank (step S202). For example, the controller 29 looks up the image data stored in the image memory 26, to thereby decide, with respect to all the pixels constituting the image on the downwardly oriented face of the document M, whether the pixel is white or black, and counts the total number of pixels and the number of white pixels. When the ratio of the number of white pixels to the total number of pixels is equal to or higher than a predetermined value (e.g., 95%), the controller 29 decides that the face of the document M is blank. On the contrary, the controller 29 decides that the face of the document M is not blank, when the mentioned ratio is lower than the predetermined value.

Upon deciding that the face of the document M is not blank ("No" at step S202), the controller 29 causes the facsimile communication device 22 to call the facsimile number of the destination inputted at step S101 through the telephone network, and to transmit, upon receipt of the call response from the facsimile machine on the receiving end, the image data representing the image on the downwardly oriented face of the document M, stored in the image memory 26, to the facsimile machine on the receiving end (step S203).

In contrast, upon deciding that the face of the document M is blank ("Yes" at step S202), the controller 29 deletes the image data representing the image on the downwardly oriented face of the document M, from the image memory 26, thereby restricting the facsimile communication device 22 from transmitting such image data (step S204).

The controller 29 causes the CIS 42 to read the image on the downwardly oriented face of the next page of the document M, and stores the image data representing the image on the downwardly oriented face of the document M in the image memory 26 ("Yes" at step S205). Then the controller 29 returns to step S202, and decides whether the face of the document M is blank, on the basis of the image data stored in the image memory 26 (step S202). Upon deciding that the face of the document M is not blank ("No" at step S202), the controller 29 causes the facsimile communication device 22 to transmit the image data representing the image on the downwardly oriented face of the document M, stored in the image memory 26, to the facsimile machine on the receiving end (step S203).

In contrast, upon deciding that the face of the document M is blank ("Yes" at step S202), the controller 29 deletes the image data representing the image on the downwardly oriented face of the document M, from the image memory 26, thereby restricting the facsimile communication device 22 from transmitting such image data (step S204).

Thereafter, the controller 29 repeats the operations of step S202 to step S205. Accordingly, the image on the downwardly oriented face of the subsequent page of the document M is read, and the image data representing the image on the downwardly oriented face of the document M is stored in the image memory 26. Provided that the downwardly oriented face of the document M is not blank, the image data representing the image on the downwardly oriented face of the document M is transmitted, but when the face of the document M is blank, the image data representing the image on the downwardly oriented face of the document M is kept from being transmitted.

When all the pages of the document M have been read ("No" at step S205), the controller 29 finishes the facsimile communication of the document.

In the second embodiment, as described above, when the facsimile communication of the document and the second moving document simplex reading mode are selected, the controller 29 decides, each time the image on the downwardly oriented face of the document M is read, whether the downwardly oriented face is blank. Upon deciding that the face that has been read is not blank, the controller 29 assumes that the image on the front face of the document M has been read, and causes the facsimile communication device 22 to transmit the image on the front face of the document M. Upon deciding, on the contrary, that the face of the document is blank, the controller 29 inhibits the facsimile communication of the document. Therefore, even though an incorrect operation is committed, such as placing the document M on the document tray 33 with the front face oriented upward, the image on the downwardly oriented face of the document M (i.e., back face) is kept from being transmitted.

Third Embodiment

Hereunder, the image reading apparatus 20 according to a third embodiment of the present invention will be described. The image reading apparatus 20 according to the third embodiment is, similarly to the image reading apparatus 20 according to the first embodiment, incorporated in the image forming apparatus 10 shown in FIG. 1 and FIG. 6, and configured as illustrated in FIG. 2 to FIG. 5.

The third embodiment is similar to the first embodiment in that, when the copying or facsimile communication of the document is selected, and one of the fixed document reading mode, the moving document duplex reading mode, and the first moving document simplex reading mode is selected, the image on the front face, or the images on both faces of the document M are read, and formed on the recording sheet or transmitted, and that when the copying of the document and the second moving document simplex reading mode are selected, the image on the downwardly oriented front face of the document M is read, and the image on the front face of the document M is formed on the recording sheet.

On the other hand, the third embodiment is different from the first embodiment in that, when the facsimile communication of the document and the second moving document simplex reading mode are selected, the controller 29 causes the CIS 42 to read the images on the downwardly oriented face of all the documents M, decides whether the downwardly oriented face is blank, with respect to all the documents M, calculates the ratio of the number of sheets n of the documents M decided not to be blank, to the total number of sheets N of the documents M, causes the facsimile communication device 22 to transmit the images on the downwardly oriented faces of all the documents M, when the calculated ratio is equal to or higher than a predetermined threshold (e.g., 50% of total number of sheets), and inhibits the facsimile communication of all the documents, when the calculated ratio is below the threshold.

Figure 9:
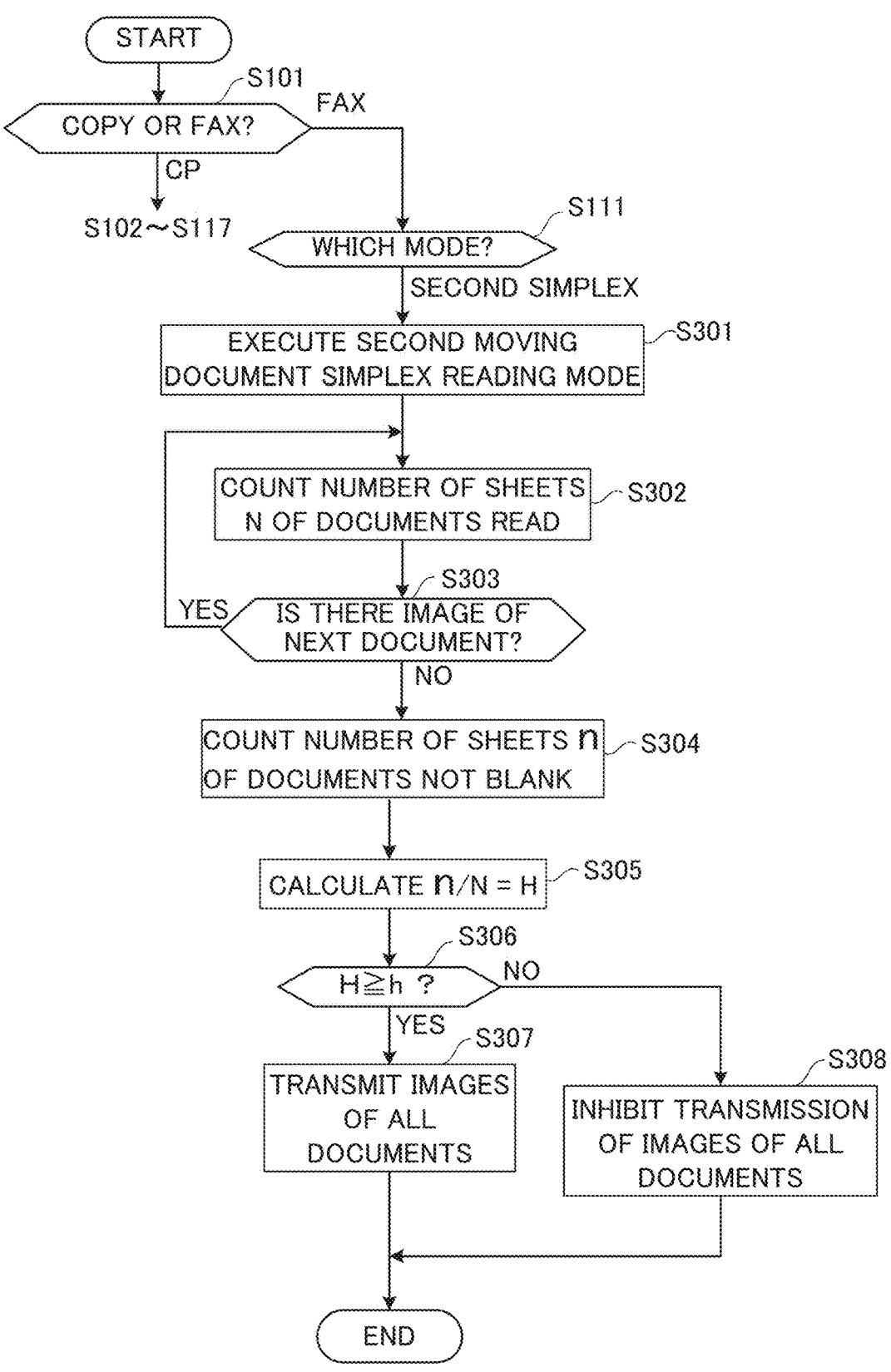
FIG. 9 is a flowchart showing a control process for copying and communication control, according to a third embodiment.

Referring now to a flowchart shown in FIG. 9, description will be given hereunder, regarding a control process in the copying and communication control operation, according to the third embodiment, to be performed to execute the copying or facsimile communication of the document, or to restrict the same, on the basis of the selection of one of the copying and the facsimile communication of the document, and one of the fixed document reading mode, the moving document duplex reading mode, the first moving document simplex reading mode, and the second moving document simplex reading mode.

In the third embodiment, the operations from step S101 to step S117 shown in FIG. 7 are performed, as in the first embodiment. Therefore, the description of the operations from step S101 to step S117 will not be repeated.

Upon deciding that the facsimile communication of the document has been selected, and that the facsimile number of the destination has been inputted ("FAX" at step S101), and further that the second moving document simplex reading mode has been selected ("SECOND SIMPLEX" at step S111), according to the instruction received via the GUI or the operation device 23, the controller 29 causes the display device 24 to display a message urging the user to place the document M on the document tray 33, with the front face (face to be read) oriented downward, and to press the start key in the operation device 23. In view of such a message, the user places the document M on the document tray 33 with the front face oriented downward, and presses the start key.

The controller 29 receives the document reading instruction, in response to the operation performed on the start key, and controls the document transport device 31 and the CIS 42, so as to transport the document M from the document tray 33, and through the common transport route 45, the second transport route 47, and the second discharge tray 49 (see FIG. 5). The controller 29 causes the CIS 42 to read the image on the downwardly oriented face of the document M (step S301), and stores the image data representing the image on the downwardly oriented face of the document M, in the image memory 26. The controller 29 counts the number of sheets N (=1) of the documents M that have been read, with a known technique (step S302).

The controller 29 returns to step S302, and counts up the number of sheets N of the documents M that have been read, each time the image on the downwardly oriented face of the next page of the document M is read, and the image data representing the image on the downwardly oriented face of the document M is stored in the image memory 26 ("Yes" at step S303).

Thereafter, the controller 29 repeats the operations of step S302 and step S303, so that the image on the downwardly oriented face of the next page of the document M is read, and the image data representing the image on the downwardly oriented face of the document M is stored in the image memory 26, and counts up the number of sheets N of the documents M that have been read.

When all the pages of the documents M have been read ("No" at step S303), the controller 29 decides whether the downwardly oriented face is blank, with respect to all the documents M, on the basis of the image data respectively representing the images on the downwardly oriented faces of all the documents M, stored in the image memory 26, and counts the number of sheets n of the documents M, the downwardly oriented face of which has been decided not to be blank (step S304).

The controller 29 calculates the ratio H of the number of sheets n of the documents M decided not to be blank, to the total number of sheets N of the documents M that have been read (step 305), and decides whether the ratio H is equal to or higher than a predetermined threshold h (e.g., h=0.5) (step S306).

Upon deciding that the ratio H is equal to or higher than the threshold h, in other words that the number of sheets n of the documents M decides not to be blank is equal to or larger than a half ("Yes" at step S306), the controller 29 causes the facsimile communication device 22 to transmit the image data respectively representing the images on the downwardly oriented faces of all the documents M, to the facsimile machine on the receiving end (step S307).

Upon deciding, on the contrary, that the ratio H is lower than the threshold h ("No" at step S306), the controller 29 deletes the image data respectively representing the images on the downwardly oriented faces of all the documents M, from the image memory 26, thereby restricting the facsimile communication device 22 from transmitting such image data (step S308).

In the third embodiment, as described above, when the facsimile communication of the document and the second moving document simplex reading mode are selected, the controller 29 decides whether the downwardly oriented face is blank, with respect to all the documents M, calculates the ratio H of the number of sheets n of the documents M decided not to be blank, to the total number of sheets N of the documents M, causes the facsimile communication device 22 to transmits the images on the downwardly oriented faces of all the documents M, when the ratio H is equal to or higher than the threshold h, and inhibits the facsimile communication of all the documents, when the ratio H is lower than the threshold h. Therefore, even though an incorrect operation is committed, such as placing the document M on the document tray 33 with the front face oriented upward, the image on the downwardly oriented back face of the document M is kept from being transmitted.

In the foregoing embodiments, the controller 29 is configured to control the facsimile communication device 22, as to whether to permit or inhibit the facsimile communication, when executing the second moving document simplex reading mode. However, the present invention is not limited to such embodiments. For example, the image forming apparatus 10 may include a communication controller, in place of or in addition to the facsimile communication device 22. In this case, the communication controller may include a communication module, to transmit and receive various types of data, to and from an external device connected via the network. The controller 29 may control the communication controller, similarly to the foregoing embodiments, as to whether to permit or inhibit the transmission of the image of the document that has been read, to the external device via the network, depending on whether the second moving document simplex reading mode is to be executed.

Further, although the reading device 32 is configured to read the image of the document M being transported through the first transport route 46, in the foregoing embodiments, the present invention is not limited to such embodiments. For example, a contact image sensor may be provided in place of the reading device 32, so that the contact image sensor may read the image of the document M being transported through the first transport route 46.

The configurations and processings according to the foregoing embodiments, described with reference to FIG. 1 to FIG. 9, are merely exemplary, and in no way intended to limit the disclosure to those configurations and processings. For example, the image reading apparatus 20 further including the controller 29 and the facsimile communication device 22 (or the communication controller) constitutes an example of the image reading apparatus according to the present invention.

The invention claimed is:

1. An image reading apparatus comprising:

a document tray;

a common transport route;

a first transport route and a second transport route branched from the common transport route;

a switching device provided at a branch point between the first transport route and the second transport route, and configured to guide a document from the common transport route, to one of the first transport route and the second transport route;

a document transport device that draws out the document placed on the document tray therefrom, transports the document through the common transport route, and delivers the document transported from the common transport route, to one of the first transport route and the second transport route, via the switching device;

a first image sensor that reads an image on a first face of the document, oriented upward on the document tray, while the document is being transported through the first transport route;

a second image sensor that reads an image on a second face of the document, oriented downward on the document tray, while the document is being transported through the common transport route;

an image communication device that transmits the image on the first face or the image on the second face, via a network or facsimile communication; and a controller includes a processor and, through the processor executing a control program, that permits the image communication device to transmit the image on the first face, read by the first image sensor, of the document being transported through the first transport route, and restricts the image communication device from transmitting the image on the second face, read by the second image sensor, of the document being transported through the common transport route and second transport route.

2. The image reading apparatus according to claim 1, further comprising a storage device, wherein the controller stores the image on the second face in the storage device, and permits the image communication device to transmit the image on the second face stored in the storage device, when the second face is not blank, but restricts the image communication device from transmitting the image on the second face stored in the storage device, when the second face is blank.

3. The image reading apparatus according to claim 2, wherein the controller stores, each time the second image sensor reads the image on the second face of each of a plurality of the documents, the image on the second face in the storage device, decides whether the second face is blank, with respect to each of the plurality of the second faces stored in the storage device, calculates a ratio of a number of the second faces decided not to be blank, to a number of all the images on the second face stored in the storage device, permits the image communication device to transmit the images on the second face decided not to be blank, stored in the storage device, when the ratio is equal to or higher than a predetermined threshold, and restricts the image communication device from transmitting all the images on the second face stored in the storage device, when the ratio is lower than the threshold.

4. The image reading apparatus according to claim 1, Wherein, when the document transport device draws out the document from the document tray, transports the document through the common transport route, and delivers the document transported through the common transport route, to the first transport route from the common transport route via the switching device, the controller permits the image communication device to transmit the image on the first face and the image on the second face, when the controller has caused the first image sensor to read the image on the first face of the document being transported through the first transport route, and has caused the second image sensor to read the image on the second face of the document being transported through the common transport route.

5. The image reading apparatus according to claim 4, wherein, upon receipt of an instruction to cause the second image sensor to read the image on the second face of the document, while transporting the document through the common transport route and the second transport route, the controller restricts the image communication device from transmitting the image on the second face, without causing the document transport device to transport the document.

6. An image forming apparatus comprising:

the image reading apparatus according to claim 1; and an image forming device that forms the image of the document, read by the image reading apparatus, on a recording sheet.

\* \* \* \* \*